INVENTOR

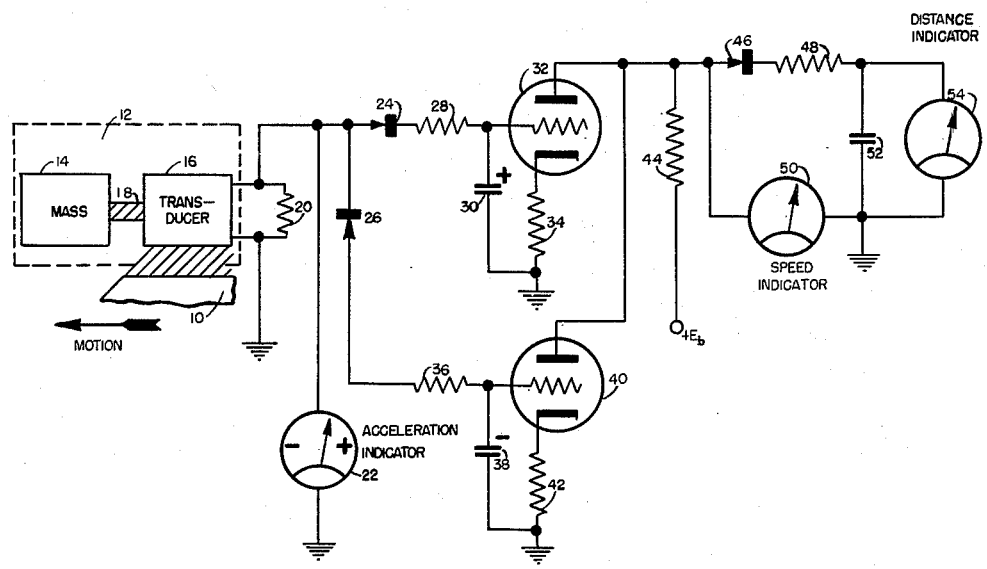
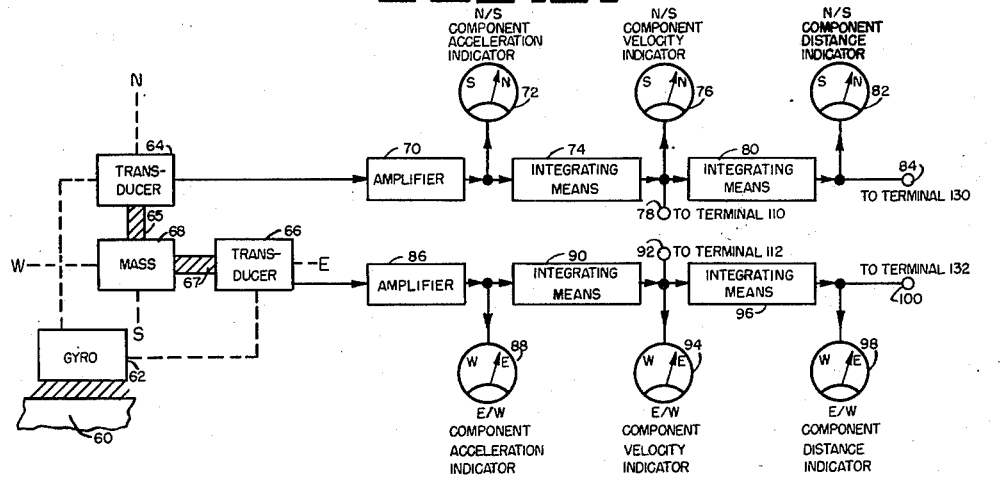

Paul G. Hansel

Patented Oct. 7, 1952

2,613,071

UNITED STATES PATENT OFFICE 2,613,071

NAVIGATION SYSTEM, INCLUDING ACCELERATION INTEGRATING MEANS

Paul G. Hansel, Long Branch, N. J.

Application June 19, 1947, Serial No. 755,694

11 Claims. (Cl. 264—1)

The present invention relates, in general, to the measurement and recording of dynamic quantities. More specifically, the invention relates to the measurement and recording of the dynamic quantities which are of particular interest in the navigation and control of aircraft, guided missiles and other moving bodies.

One of the objects of this invention is to provide a novel system for indicating velocities of and distances traversed by moving bodies.

Another and more specific object is to provide a comprehensive and integrated system for the navigation of aircraft which is free from the inadequacies and inherent difficulties charactistic of conventional systems.

When conventional systems are employed for the navigation of aircraft, several difficulties arise. For example, absolute ground speed is rarely determinable with these systems. Moreover, although the heading of an aircraft may be determined readily, cross winds frequently give rise to velocity components which are normal to the heading and unknown in magnitude, thus making it a difficult matter to determine the resultant direction of travel.

It is accordingly one of the objects of this invention to provide a novel system for the determination of the true velocity of an aircraft, that is, for the determination of both the absolute ground speed and of the absolute direction of travel, without regard to the direction of heading.

Another disadvantage of the prior-art aircraft navigation systems is the necessity for the establishment and maintenance of elaborate and costly ground installations. The reliability of the navigational data provided by existing systems is also frequently disturbed by factors associated with the many vicissitudes of radio wave propagation and, as a result, the pilots of aircraft are often reluctant to rely upon ground-based instrumentalities.

The present invention overcomes these disadvantages by providing a novel navigation system for aircraft based upon the fundamental laws of dynamics and possessing the feature that all of the required instrumentalities can be installed in the aircraft under the control of the pilot and are completely independent of any associated instrumentalities outside of the aircraft.

The novel manner in which these and further objects are attained will now be disclosed by reference to the following description and to the appended drawings. In the drawings:

Fig. 1 is a schematic circuit diagram of a simple electrical embodiment of certain features of the invention.

Fig. 2 is a functional block diagram of a portion of a comprehensive navigation system assembled in accordance with the principles of the invention.

Figure 3:
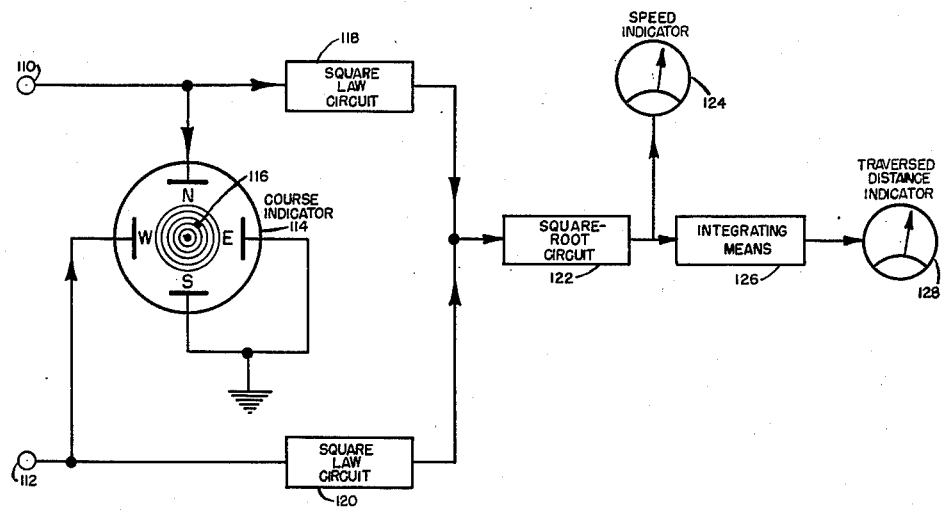
Fig. 3 and Fig. 4 illustrate additional novel features of the invention intended particularly for use with the system shown in Fig. 2.

Referring to Fig. 1, an elementary electrical embodiment of certain features of this invention will now be described. In the form shown in Fig. 1, the invention is particularly adapted for the control and flight monitoring of guided missiles and small aircraft. The reference number 10 indicates generally a movable body to which an accelerometer 12 is rigidly coupled. Said accelerometer, in its simplest form, may comprise a mass 14 coupled through element 18 to a transducer 16. The term transducer, as employed in this specification, denotes generally a device which will deliver a proportional electrical output in response to a mechanical-force input. The transducer 16 may take any of several known forms such as, for example, a piezo-electric plate or a stress-sensitive resistor and battery. Complete accelerometers suitable for use with this invention, and transducers of the stress-sensitive resistor type are manufactured and sold commercially by Statham Laboratories, 12401 West Olympic Blvd., Los Angeles 64, California. Suitable accelerometers are also available from both G. M. Giannini and Co., Inc. of Pasadena 1, California, and Schaevitz Engineering Co. of Camden, New Jersey. Schaevitz Engineering Co. also manufactures a suitable transducer of the linear variable-differential transformer type. A triode vacuum tube transducer, manufactured by Radio Corporation of America, Camden, New Jersey, and sold under the designation "RCA-5734 Mechano-Electronic Transducer" may also be used. A detailed description of a practical accelerometer employing a stress-sensitive resistor as the transducer element is published in "Instruments," vol. 19, No. 3, March 1946 under the title, "Applications of unbonded-type resistance gages." For a comprehensive discussion of conventional transducers, reference is made to the book "Electromechanical Transducers and Wave Filters" by W. Mason, Van Nostrand, New York, 1942. It is apparent from Fig. 1 that any change in the motion of the movable body 10 along the direction indicated by the arrow will be accompanied by a positive or a negative acceleration of the mass 14. The force required to change the momentum of mass 14 will be transmitted through the coupling element 18 to the transducer 16. The transducer will, in turn, establish across resistor 20 a voltage proportional to said force. A meter 22 connected across resistor 20 will be deflected in accordance with said voltage and will therefore indicate the acceleration of the body 10.

Also connected to the output of the transducer 16 is a means for integrating the positive acceleration and another means for integrating the negative acceleration. The integrating means for the negative acceleration comprises an electrical capacitor 30, a resistor 28, and a unilateral impedance 24. The positive acceleration is integrated by means of a like arrangement comprising capacitor 38, resistor 36, and a unilateral impedance 26. The unilateral impedances 24 and 26 serve to prevent discharge of capacitors 30 and 38 and may be diode-type vacuum tubes or crystal rectifiers.

The grid of a vacuum tube 32 is connected across capacitor 30 and the grid of a second vacuum tube 40 is connected across capacitor 38. A common load impedance 44 is provided for the anode circuits of the vacuum tubes. The terminal labeled $+E_b$ is connected to the positive terminal of a conventional direct-current anode supply having the negative terminal grounded and an output of, for example, 150 to 300 volts. The current through and consequently the voltage across said load impedance are proportional to the difference between the integrals of the positive and negative accelerations or, in other words, to the velocity of the body 10 in the direction of the arrow. A voltmeter 50 connected across load impedance 44 serves therefore to indicate the instantaneous ground speed. Connected across the load impedance 44 is an integrating arrangement comprising a unilateral impedance 46 in series with a resistor 48 and a capacitor 52. The voltage across capacitor 52 is proportional to the integral of the ground speed or, in other words, to the traversed distance. A voltmeter 54, connected across capacitor 52 as shown responds to this voltage and thus serves to indicate traversed distance.

For greatest accuracy, the structural elements shown in Fig. 1 should be chosen with certain practical considerations in mind. For example, the parameters of the resistors and capacitors employed in the integrating circuits should be chosen, in general, to provide a long time constant. The practical design values will, of course, vary greatly for various particular applications. It is also particularly essential for capacitors 30, 38 and 52 to have very low leakage. Indicator 54 is preferably of the electrostatic type although any type of instrument may be employed which will not discharge the integrating capacitor 52.

Although electrical elements are shown in Fig. 1, it is obvious that an equivalent system can be assembled in accordance with the principles of this invention without the use of electrical elements. For example, several mechanical, chemical and electro-mechanical methods of integration are known in the computer art which could be employed in place of the resistor-capacitor networks to perform the required integrating functions. In the design of practical systems based upon this invention the intended application will, of course, dictate the preferable methods for performing these functions. Equipment intended for flights of relatively short duration in rockets or guided missiles will generally employ resistor-capacitor integrating circuits of the simple form shown in Fig. 1. For other applications, for example when aircraft flights of several hours duration are involved, the required integrating functions can usually be performed more accurately with more complex means such as electronic storage tubes, mechanical clockwork, counter arrangements or electro-chemical, photographic or thermal integrators. These means are described in the literature of the computer art and need not be described in detail here. Mechanical integrators are described in the book "Designing Computing Mechanisms by Macon Fry, reprinted from "Machine Design," August 1945 to February 1946, Penton, Cleveland, Ohio, 1946. Several well known forms of the more complex integrators suitable for use in the practice of this invention are described in "Electron Time Measurements," pages 280 to 308, McGraw-Hill Book Company, New York, 1949.

The use of electrical analogies to explain complex functional systems is a common practice in engineering; therefore, although this invention is disclosed here largely in terms of electrical elements, it is emphasized that the invention can also be practiced with functionally-analogous non-electrical elements.

Figure 4:
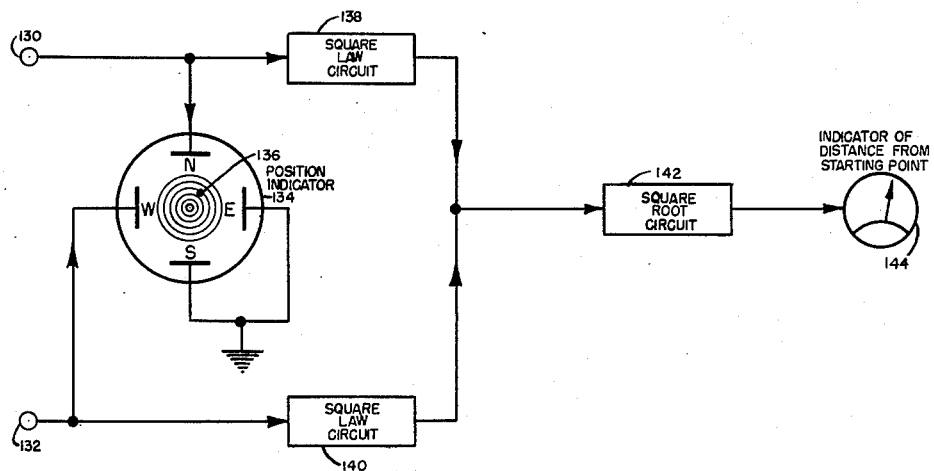

The safe and efficient navigation of aircraft in world-wide traffic often requires much more information than the simple system shown in Fig. 1 can provide. With reference to Fig. 2, Fig. 3 and Fig. 4, a more comprehensive navigation system embodying the principles of this invention will now be described.

Referring particularly to Fig. 2, the reference number 60 represents a moving or movable body such as an aircraft. A gyroscopic mechanism 62 is mounted on the body 60 and serves to establish a pair of mutually-perpendicular reference axes, for example, a north-south axis and an east-west axis. A transducer 64 is coupled through element 65 to a mass 68 and responds to changes in the momentum of said mass along the north-south axis. Similarly, a second transducer 66 is coupled through element 67 to the mass and responds to momentum changes along the east-west axis.

Amplifiers 70 and 86 are receptive of the outputs of transducers 64 and 66 respectively. Indicating instruments 72 and 88 respond to the acceleration components along the respective axes. An integrating means 74 is employed to integrate the north-south acceleration and a corresponding element 90 integrates the east-west accelerations.

The output of integrating means 74 is proportional to the north-south component of the velocity of body 60 and the output of element 90 is proportional to the east-west component of said velocity. Indicators 76 and 94 respond to the north-south and east-west components respectively.

Integrating means 80 and 96 integrate the north-south and east-west velocity components respectively and indicators 82 and 98, which are receptive of the outputs of elements 80 and 96 respectively, therefore indicate the coordinates of the position of body 60 from the starting or reference point as measured along the north-south and east-west axes respectively.

Associated with the arrangements shown in Fig. 2 are the features of this invention illustrated in Fig. 3. Terminal 78 of Fig. 2 is connected to terminal 110 of Fig. 3. Similarly, terminal 92 of Fig. 2 is connected to terminal 112 of Fig. 3, The individual inputs to terminals 110 and 112 are proportional to the north-south and the east-west velocity components respectively. These inputs are applied to the deflection plates of a cathode-ray tube 114 in the manner illustrated. The trace 116 on the screen is therefore deflected along one coordinate axis by an amount proportional to the north-south velocity component and along a second coordinate axis, perpendicular to the first, by an amount proportional to the east-west velocity component. The cathode-ray tube thus serves to compound the velocity components vectorially and the resultant position of the trace 116 on the screen indicates the velocity of the moving body. In other words, the distance from the center of the screen to the trace 116 indicates ground speed and the angular position of the trace relative to the deflection axes indicates the direction of motion. A series of concentric circles placed over the screen as shown may be used to measure the magnitude of the velocity and a conventional alidade and compass scale, which are omitted to simplify the drawing, may be used to measure the direction of motion implicit in the angular position of the trace.

The course indicator just described possesses a very significant advantage in that the absolute direction of motion and not merely the heading of the aircraft is indicated. For example, because of cross-winds, an aircraft may be moving northeast even though its heading may be due north. The absolute direction of motion indicated by the angular position of trace 116 is much more important in navigation than the heading of the craft.

The signals available at terminals 110 and 112 are proportional to the north-south and east-west velocity components respectively and may readily be employed to operate course-control servo-mechanisms. Any desired course can be flown by adjusting the servo-mechanisms to maintain the proper ratio between said signals.

To carry out certain additional purposes of this invention, the north-south velocity-dependent signal applied to terminal 110 is impressed upon a square-law circuit 118 and the east-west velocity-dependent signal applied to the terminal 112 is impressed upon an identical square-law circuit 120. The square-law circuits may take several known forms such as vacuum tube circuits adjusted to present a parabolic input-output characteristic or thermo-electric arrangements. The outputs of square-law circuits 118 and 120 are combined and applied to a square-root circuit 122. The latter circuit may also be constructed according to well known methods. Conventional square-law and square-root circuits are described in the book "Waveforms," pages 678 to 693, McGraw-Hill Book Co., New York, 1949. The output of the square-root circuit is proportional to the square-root of the sum of the squares of the north-south and east-west velocity components or to the magnitude of the velocity of the moving body. An indicator 124, receptive of this output, therefore indicates ground speed. Indicator 124 may take the form of a recorder and may also include a flight-control device.

Also receptive of the output of the square-root circuit 122 is an integrating means 126 which serves to integrate the ground speed and thus to produce an output proportional to the total distance traversed by the moving body. This output is applied to a traversed-distance indicator 128 which is analogous to the mileage indicator in an automobile.

With particular reference to Fig. 4, additional novel features of this invention will now be described. Terminals 130 and 132 are receptive of signals from terminals 84 and 100 respectively. It will be recalled that the signals existing at terminals 84 and 100 are proportional to the north-south and east-west distance components respectively. One set of deflection plates of a cathode-ray tube 134 is connected to terminal 130 and the orthogonal set of plates is connected to terminal 132. The trace 136 is therefore deflected along one coordinate axis on the screen of the tube by an amount proportional to the north-south distance and along a perpendicular coordinate axis by an amount proportional to the east-west distance. The cathode-ray tube performs the function of combining the component distances vectorially and the trace position, at any instant, therefore, indicates both the direct-line distance and direction from the starting point. Concentric circles on the screen of the cathode-ray tube can be calibrated directly in distance terms. In some cases it is useful to place a transparent map overlay on the screen with the starting point or some other reference point on the map directly over the center.

For some purposes it is useful to have an auxiliary indication of the distance from the starting point. This is particularly true when either greater accuracy or a more permanent record is required than can be obtained with a cathode-ray tube. Accordingly, square-law circuits 138 and 140 are connected to terminals 130 and 132 as shown in Fig. 4. The outputs of said square-law circuits are combined and the resultant signal is impressed upon a square-root circuit. The square-law and square-root circuits add the component distances vectorially and the output of the square-root circuit 142, which is proportional to the distance from the starting or reference point, is impressed upon indicator 144. The latter element may include a recorder if a permanent record is required. A flight-control arrangement may also be associated with element 144.

While there have been described what are at present considered to be the preferred embodiments of the invention, it will be obvious to those skilled in the art that numerous changes and modifications may be made therein without departing from the invention, and it is, therefore, aimed in the appended claims to cover all such changes and modifications as fall within the true spirit and scope of the invention.

What is claimed is:

1. A navigation system comprising; means for determining velocity components along a pair of mutually perpendicular axes, a cathode ray tube, means for deflecting the trace on the screen of said cathode ray tube along one axis in accordance with one of said velocity components, and means for deflecting said trace along a second axis orthogonal to said first-named axis in accordance with the second of said velocity components.

2. A navigation system comprising; means for determining velocity components along a pair of mutually perpendicular axes, a cathode ray tube, means for deflecting the trace on the screen of said cathode ray tube along one axis in accordance with the integral of one of said velocity components, and means for deflecting said trace along a second axis orthogonal to said first-named axis in accordance with the integral of the second of said velocity components.

3. A system according to claim 1 including means for effectively maintaining a particular geographical orientation of said mutually perpendicular axes.

4. A system according to claim 2 including means for effectively maintaining a particular geographical orientation of said mutually perpendicular axes.

5. A navigation system comprising; means responsive to acceleration components along each of a pair of mutually perpendicular axes, means for integrating each of said acceleration components twice, means including a cathode-ray tube for compounding vectorially the first integrals of said acceleration components, and means including a cathode-ray tube having a pair of quadrature deflection means for compounding vectorially the second integrals of said acceleration components.

6. A motion measuring system comprising; a mass, a transducer responsive to changes in the momentum of said mass, a first integrating arrangement receptive of transducer outputs corresponding to positive accelerations of said mass, a second integrating arrangement receptive of transducer outputs corresponding to negative accelerations of said mass, means for combining the outputs of said first and second integrating arrangements to produce a resultant proportional to instantaneous speed, a speed indicator responsive to said resultant, means for integrating said resultant and a displacement indicating arrangement responsive to the integral of said resultant.

7. A navigation system comprising; means for effectively establishing in a given geographical orientation a pair of mutually perpendicular axes, means for integrating acceleration components as resolved along each of said axes, means for compounding vectorially the integrals of said acceleration components to obtain a resultant proportional to speed, said last-named means including a pair of square-law circuits and means for combining and effectively extracting the square-root of the combined outputs of the square-law circuits, and means for integrating the integrals of said acceleration components.

8. A system according to claim 7 including in addition, means for integrating said resultant and means responsive to the integral of said resultant.

9. A system according to claim 7 including in addition, means for compounding vectorially the integrals of the integrals of said acceleration components to obtain a displacement-dependent resultant and means responsive to said last-named resultant.

10. A system according to claim 7 including in addition, means for integrating said resultant, means responsive to the integral of said resultant, means for compounding vectorially the integrals of the integrals of said acceleration components to obtain a displacement-dependent resultant and means responsive to said last-named resultant.

11. A ground-speed indicator comprising; a mass, a transducer giving an output proportional to the acceleration of said mass, means for integrating positive outputs of said transducer, means for integrating negative outputs of said transducer, a pair of isolating amplifiers for combining the integrals of said positive and negative outputs and speed-indicating means responsive to the difference between the integrals of said positive and negative outputs.

PAUL G. HANSEL.

REFERENCES CITED

The following references are of record in the file of this patent:

UNITED STATES PATENTS

| Number | Name | Date |
|---|---|---|
| 1,728,904 | Herr | Sept. 17, 1929 |
| 2,266,449 | Ullrich | Dec. 16, 1941 |
| 2,328,985 | Luck | Sept. 7, 1943 |
| 2,371,626 | Kecskemeti | Mar. 20, 1945 |
| 2,385,334 | Davey | Sept. 25, 1945 |
| 2,428,800 | Holden | Oct. 14, 1947 |
| 2,447,517 | Manson | Aug. 24, 1948 |
| 2,454,782 | de Rosa | Nov. 30, 1948 |
| 2,455,939 | Meredith | Dec. 14, 1948 |

FOREIGN PATENTS

| Number | Country | Date |
|---|---|---|
| 411,124 | Great Britain | May 29, 1934 |

OTHER REFERENCES

"Electronic Industries," August 1943; pp. 65-72 and p. 216.